United States Patent [19]

Backhouse

[11] Patent Number: 4,539,363

[45] Date of Patent: Sep. 3, 1985

[54] PIGMENTED BASECOAT COMPOSITION

[75] Inventor: Alan J. Backhouse, South Ascot, England

[73] Assignee: Imperial Chemical Industries PLC, London, England

[21] Appl. No.: 651,313

[22] Filed: Sep. 17, 1984

Related U.S. Application Data

[63] Continuation-in-part of Ser. No. 464,866, Feb. 8, 1983, abandoned.

[30] Foreign Application Priority Data

Oct. 21, 1981 [GB] United Kingdom ............... 8012199

[51] Int. Cl.$^3$ .............................................. C08L 33/02
[52] U.S. Cl. .................................... 524/460; 524/458; 524/522; 524/533
[58] Field of Search ............... 524/458, 460, 522, 533

[56] References Cited

U.S. PATENT DOCUMENTS

| | | | |
|---|---|---|---|
| 4,069,186 | 1/1978 | Ramig | 524/523 |
| 4,115,338 | 9/1978 | Kobayashi et al. | 524/524 |
| 4,150,005 | 4/1979 | Gehman et al. | 524/533 |
| 4,220,675 | 9/1980 | Imazaki | 427/409 |
| 4,220,679 | 9/1980 | Backhouse | 427/407.1 |
| 4,229,336 | 10/1980 | Sicklesteel | 524/460 |
| 4,419,465 | 12/1983 | Backhouse et al. | 524/522 |
| 4,461,870 | 7/1984 | Karda et al. | 524/522 |

FOREIGN PATENT DOCUMENTS 2039497 8/1980 United Kingdom .

*Primary Examiner*—Paul R. Michl
*Assistant Examiner*—A. H. Walker
*Attorney, Agent, or Firm*—Cushman, Darby & Cushman

[57] ABSTRACT

For use in a process for producing a multi-layer coating upon a substrate surface, in which there is first applied to the surface a pigmented basecoat composition and there is then applied to the basecoat film a transparent topcoat composition, a pigmented basecoat composition which is based upon a dispersion in an aqueous medium of crosslinked polymer microparticles which have a diameter of 0.01–10 microns, are insoluble in the aqueous medium and are stable towards gross flocculation, the dispersion having a pseudoplastic or thixotropic character.

9 Claims, No Drawings

PIGMENTED BASECOAT COMPOSITION

This invention is a continuation-in-part of application Ser. No. 464,866 filed Feb. 8, 1983, now abandoned.

This invention relates to the application of protective and decorative coatings to surfaces, particularly the surfaces of automobile bodies.

It is well known to employ, especially in the automobile industry, coating compositions which contain metallic pigments; these are the so-called "glamour metallic" finishes whereby a differential light reflection effect, depending on the viewing angle, is achieved. To maximise this "flip" tone effect, careful formulation of the coating composition in regard both to the film-forming resin and to the liquid medium is required. Difficulties may be encountered in formulating a single composition which both meets this objective and at the same time achieves a high degree of gloss in the final finish such as is usually desired in the automobile field. For this reason, one of the procedures which has been proposed for producing metallic finishes is a two-coat procedure, in which there is first applied by spraying, to the surface of the substrate, a basecoat containing the metallic pigment and formulated so as to give the optimum "flip" effect, and there is then applied over the basecoat, again by spraying, an unpigmented topcoat which will yield the desired degree of gloss without in any way modifying the characteristics of the basecoat.

For a successful two-coat metallic finish system of this "basecoat/clearcoat" type, an essential criterion is that the basecoat film must be able to resist attack by the solvents in the clearcoat composition when the latter is subsequently applied, in order to avoid disturbance of the metallic pigment and hence impairment of the "flip" effect; it is, moreover, very desirable that the basecoat film should possess this property without the need for an extended intermediate drying or curing operation.

In the known basecoat/clearcoat systems, in which both the basecoat and the clearcoat compositions are organic solvent-borne, this requirement has in most cases been met by the use of an additive capable of imparting a gel-like character to the freshly formed basecoat film; the additive which has predominantly been used is cellulose acetate butyrate. The transition between the relatively low viscosity, which the basecoat composition is required to have at the spray gun, and this gel-like character is assisted by arranging that the liquid diluent of the composition contains volatile components which are preferentially lost by evaporation during the passage from the spray gun to the substrate.

For reasons of avoiding atmospheric pollution, considerable interest has developed in recent years in coating compositions which employ water as the diluent rather than organic solvents. A number of such compositions has been proposed for use in the automobile industry. It has not, however, hitherto been possible to employ waterborne compositions satisfactorily as the basecoat component of a basecoat/clearcoat system. One of the factors tending to inhibit the successful achievement of such an objective is the extreme difficulty of arranging for controlled selective loss of diluent from the basecoat composition by evaporation between spray gun and substrate, except by means of very expensive regulation of the ambient humidity in the spray area. We have, however, now found that a satisfactory water-borne basecoat composition can be based upon an aqueous dispersion of a crosslinked polymer microgel.

Thus according to the present invention there is provided a process for the production of a multi-layer protective and/or decorative coating upon a substrate surface, which comprises the steps of:

(1) applying to the surface a basecoat composition comprising (a) film-forming material (b) a volatile liquid medium for the said material and (c) pigment particles dispersed in the said liquid medium;

(2) forming a polymer film upon the surface from the composition applied in step (1);

(3) applying to the basecoat film so obtained a transparent topcoat composition comprising (d) a film-forming polymer and (e) a volatile carrier liquid for the said polymer; and (4) forming a second polymer film upon the basecoat film from the composition applied in step (3), characterised in that the constituents (a) and (b) of the basecoat composition are provided by a dispersion in an aqueous medium of crosslinked polymer microparticles which have a diameter in the range 0.01 to 10 microns, are insoluble in the said aqueous medium and are stable towards gross flocculation, the dispersion having a pseudoplastic or thixotropic character.

The crosslinked polymer microparticles may be composed of various types of polymer. Of particular interest for this purpose are the acrylic addition polymers, derived from one or more alkyl esters of acrylic acid or methacrylic acid, optionally together with other ethylenically unsaturated monomers. Suitable acrylic or methacrylic esters include methyl methacrylate, ethyl methacrylate, propyl methacrylate, butyl methacrylate, ethyl acrylate, butyl acrylate and 2-ethylhexyl acrylate. Suitable other, copolymerisable monomers include vinyl acetate, vinyl propionate, acrylonitrile, styrene and vinyl tolune. Since the polymer is required to be crosslinked, there may be included in the monomers from which the polymer is derived a minor proportion of a monomer which is polyfunctional with respect to the polymerisation reaction, e.g. ethylene glycol dimethacrylate, allyl methacrylate or divinylbenzene; alternatively there may be included in those monomers minor proportions of two other monomers carrying pairs of chemical groups which can be caused to react with one another either during or after the polymerisation reaction, such as epoxy and carboxyl (as for example, in glycidyl methacrylate and methacrylic acid), anhydride and hydroxyl or isocyanate and hydroxyl.

The chemical composition and degree of crosslinking of the microparticle polymer may be such that it has a Tg (glass-rubber transition temperature) below room temperature, in which case the microparticles will be rubbery in nature; alternatively, it may be such that the Tg is above room temperature, that is to say the particles will be hard and glassy.

As already specified, it is necessary that the polymer microparticles be dispersed in the basecoat composition in a state which is stable towards gross flocculation, that is to say, a state in which, even at low solids contents, the dispersion contains few if any multi-particle aggregates; this does not, however, preclude the possibility of a slight degree of particle flocculation especially at higher solids contents. This state may be achieved, for example, by steric stabilisation, that is to say by the provision around the particles of a barrier of chains of a different polymer which are solvated by the aqueous medium of the composition and hence exist in a chain-extended configuration. In this context, the term "solvated" implies that the polymer chains in question, if they were independent molecules, would be actually soluble in the said aqueous medium; however, because the chains are in fact attached to the microparticles at one or more points along their length, the steric barrier remains permanently attached to the microparticles. Polymer microparticles which are sterically stabilised in this way may conveniently be produced by a process of dispersion polymerisation of the appropriate monomers in the aqueous medium, in the presence of a steric stabiliser. The stabiliser is amphipathic in nature, that is to say it contains in the molecule two essential polymeric components of differing characteristics: one component is a polymer chain which is solvated by the aqueous medium, and the other component is a polymer chain which is not solvated by that medium and in consequence anchors itself to the polymer microparticles which are by definition insoluble in the aqueous medium. Suitable dispersion polymerisation processes are described in our British Patent Application No. 7940088 (now published as Application No. 2039497 A). The aqueous medium in which the polymerisation is carried out consists of water admixed with a volatile organic co-solvent, the mixture as a whole being capable of dissolving the monomers, most or all of which would be substantially insoluble in water alone. These procedures involve the additional requirement that the polymerisation be conducted at a temperature which is at least 10° C. higher than the glass transition temperature of the polymer which is to be formed, and in such a manner that at no time is there present a separate monomer phase. The amphipathic steric stabiliser may be added to the polymerisation mixture as a pre-formed substance, or it may be formed in situ during the polymerisation from a polymer which is soluble in the aqueous medium and is able to copolymerise with, or, through hydrogen abstraction, to undergo grafting by, some of the monomer being polymerised. The sterically stabilised microparticle dispersions which are obtained by these procedures are very suitable for the formulation of basecoat compositions to be used in accordance with the present invention, since it is possible to remove the organic co-solvent from them by distillation without impairing the stability of the disperse phase, yielding a product in which the continuous phase consists solely of water.

Alternatively, the dispersion of polymer microparticles may be obtained by the aqueous emulsion polymerisation of the appropriate monomers, in which case the stability towards flocculation is conferred by the presence on the particles of electrically charged species derived from a water-soluble, ionised surfactant and/or a water-soluble, ionisable polymerisation initiator. Such polymerisation processes are extensively described in the literature.

Yet again, the polymer microparticles may be made by a process of non-aqueous dispersion polymerisation of monomers, followed by transfer of the resulting polymer to the aqueous medium. Such a procedure is described in our British Patent Application No. 42457/77. (now published as Application No. 2006229 A). It involves in a first step forming a sterically stabilised dispersion in a non-aqueous liquid of a polymer which is insoluble both in the non-aqueous liquid and in water, using any of the procedures which are well known in the art for making such dispersions; then in a second step polymerising in the dispersion thus obtained, in the presence of a steric stabiliser, one or more monomers which can give rise to a second polymer which is inherently soluble in the desired aqueous medium at an appropriate pH; and finally transferring the resulting composite polymer microparticles from the non-aqueous medium to the aqueous medium.

The foregoing discussion has centred on the case where the crosslinked polymer microparticles are composed of an addition polymer, this being the most convenient type of polymer for the present purpose. It is possible, however, for the microparticles alternatively to be composed of a condensation polymer, for example a polyester prepared from a polyhydric alcohol and a polycarboxylic acid. Suitable polyhydric alcohols include ethylene glycol, propylene glycol, butylene glycol, 1:6-hexylene glycol, neopentyl glycol, diethylene glycol, triethylene glycol, tetraethylene glycol, glycerol, trimethylolpropane, trimethylolethane, pentaerythritol, dipentaerythritol, tripentaerythritol, hexanetriol, oligomers of styrene and allyl alcohol (for example that sold by Monsanto Chemical Company under the designation RJ 100), the condensation products of trimethylolpropane with ethylene oxide or propylene oxide (such as the products known commercially as "Niax" triols: "Niax" is a Registered Trade Mark). Suitable polycarboxylic acids include succinic acid (or its anhydride), adipic acid, azelaic acid, sebacic acid, maleic acid (or its anhydride), fumaric acid, muconic acid, itaconic acid, phthalic acid, (or its anhydride), isophthalic acid, terephthalic acid, trimellitic acid (or its anhydride) and pyromellitic acid (or its anhydride). Such polymers are caused to be crosslinked by the incorporation of materials of functionality greater than two in the starting composition, although in this case, because of the characteristically broad distribution of molecular species formed in a condensation polymerisation as compared with that of an addition polymerisation, it may be difficult to ensure that all these species are in fact crosslinked.

It will be appreciated that the methods which have been referred to above for making polymer microparticles by polymerisation of addition-type monomers in an aqueous medium are not, in general, applicable to condensation-type monomers because of the inhibiting effect of water on the condensation reaction. Condensation polymer microparticles may, however, readily be made by dispersion polymerisation in non-aqueous media according to the procedures described in our British Patent Specifications Nos. 1,373,531; 1,403,794 and 1,419,199 and methods of obtaining crosslinked microparticles are included in these descriptions. Such microparticles may then be subjected, in dispersion in the non-aqueous medium, to the second polymerisation step of the procedure of British Patent Application No. 42457/77 (published Application No. 2006229A) referred to above, followed by their transfer to the chosen aqueous medium.

By "aqueous medium" is meant herein either water alone or water in admixture with a water-miscible organic liquid such as methanol; the aqueous medium may also contain water-soluble substances introduced for the purpose of adjusting the pH of the basecoat composition, as discussed in more detail below.

The pigment particles which, as already defined, are dispersed in the aqueous medium of the basecoat composition may range in size from 1 to 50 microns and may be of any of the pigments conventionally used in surface coating compositions, including inorganic pigments such as titanium dioxide, iron oxide, chromium oxide, lead chromate and carbon black, and organic pigments such as phthalocyanine blue and phthalocyanine green, carbazole violet, anthrapyrimidine yellow, flavanthrone yellow, isoindoline yellow, indanthrone blue, quinacridone violet and perylene reds. For the present purpose, the term "pigment" is here meant to embrace also conventional fillers and extenders, such as talc or kaolin.

The process of the invention is of particular relevance to the case of basecoat compositions containing metallic flake pigmentation which are intended for the production of "glamour metallic" finishes chiefly upon the surfaces of automobile bodies as previously discussed, suitable metallic pigments including in particular aluminium flake and copper bronze flake. However, the invention offers advantages also in the production of "solid colour" finishes, as discussed below. In general, pigments of any kind may be incorporated in the basecoat compositions in an amount of from 2% to 100% of the total weight of the composition. Where metallic pigmentation is employed, this is preferably in an amount of from 5% to 30% by weight of the aforesaid total weight.

Such pigments, whether metallic or otherwise, may be incorporated into the basecoat compositions with the aid of known pigment dispersants suitable for use in aqueous systems.

The presence of the crosslinked polymer microparticles in the basecoat composition confers upon the film derived from the latter the desired ability to withstand subsequent application of the topcoat composition without disturbance of the film or of the pigmentation, in particular metallic pigmentation, which it contains and without which, therefore, a successful basecoat/clearcoat system cannot be achieved.

In addition to this essential feature, it is also required, as stated above, that the dispersion of insoluble microparticles should possess a pseudoplastic or thixotropic character. By this is meant that the apparent viscosity of the dispersion will differ according to the degree of shear to which the dispersion is subjected and, more particularly, that the apparent viscosity under low shear is greater than it is under high shear. The change in viscosity consequent upon a change in the shear applied may be instantaneous or it may require a finite time interval which is nevertheless within the time scale of the viscosity measurement. The reason for requiring this character in the dispersion on which the basecoat composition is based is most apparent in the case where that composition contains a metallic flake pigment. It is then desirable that the total concentration of non-volatile solids present should be relatively low, in order to achieve a substantial shrinkage of the basecoat film after application to the substrate and during the drying operation, and thereby to ensure correct orientation of the metallic flake and hence optimum "flip" effect. It is, however, necessary, where the basecoat composition is to be applied to a substrate by spraying, that the composition should have a low enough viscosity for efficient atomisation at the spray gun, and yet, once it has reached the substrate, that its viscosity should be high enough to prevent "sagging" or "running" of the film, or the development of "sheariness" (uneven distribution and orientation) of the metallic flake, even if the loss of water and other solvents by evaporation between the spray gun and the substrate is only slight (owing to a high ambient humidity).

The possession of such pseudoplastic properties is often expressed by quoting values of $\eta_a$ (apparent viscosity in poise) at selected values of D (shear rate in sec $^{-1}$). In the case of metallic pigmented basecoat compositions to be used according to the invention, the value of $\eta_a$, at a solids content of less than 30% by weight non-volatiles, should preferably be less than 0.5 poise at a shear rate D of 10,000 sec $^{-1}$, and more than 20 poise at a value of D of 1.0 sec $^{-1}$. Even more preferably, the basecoat composition should have a value of $\eta_a$ of less than 0.25 poise at a value of D of 10,000 sec $^{-1}$ and of more than 40 poise at a value of D of 1.0 sec $^{-1}$. In the case of "solid colour" basecoat compositions incorporating pigments other than metallic flake, it is preferred that $\eta_a$, again at solids contents below 30%, should be less than 1 poise at D=10,000 sec $^{-1}$ and more than 5 poise at D=1.0 sec $^{-1}$; even more preferably, $\eta_a$ is less than 0.7 poise at D=10,000 sec $^{-1}$ and more than 10 poise at D=1.0 sec $^{-1}$. It is, however, in the nature of pseudoplastic or thixotropic behaviour that it cannot be fully and accurately defined by a few selected viscosity/shear data; much depends upon the actual method of viscosity measurement employed. It is, therefore, not intended that the values quoted above should be considered as rigid limits which must be adhered to in order to achieve the benefits of the invention; they are, rather, given as an approximate guide only and the skilled person can readily determine, by simple practical tests, whether a particular dispersion, or the basecoat composition derived from it, possesses the necessary degree of pseudoplasticity or thixotropy.

There are various ways in which a pseudoplastic or thixotropic character can be conferred upon the basecoat dispersion. In certain cases, no special measures are required. This may be so, for example, where the microparticles have been prepared by the above-mentioned procedure described in British Patent Application No. 42457/77 (published Application No. 2006229A). This procedure involves first of all the production of the polymer microparticles proper by a process of non-aqueous dispersion polymerisation of the appropriate monomers, followed by polymerisation of further monomers in order to produce a second polymer which is essentially non-crosslinked and is of a hydrophilic character such that it is inherently capable of dissolving in the aqueous medium in which the final dispersion is to be formed, at an appropriate pH. Not all this second polymer does, however, in fact dissolve in the aqueous medium on the transferring to it of the product of these two non-aqueous polymerisation steps. A substantial part of the second polymer remains associated with the polymer microparticles, and the microparticles are thereby stabilised in dispersion in the aqueous medium; at the same time, however, this associated polymer may result in the aqueous dispersion exhibiting pseudoplastic or thixotropic properties. Further monomers which are suitable for use in the second polymerisation step are, for example, a hydroxyalkyl ester of acrylic acid or methacrylic acid, a monoacrylic or mono-methacrylic ester of a polyglycol such as polyethylene glycol, a monovinyl ether of such a polyglycol, or vinyl pyrrolidone, optionally in admixture with smaller proportions of non-hydrophilic monomers such as methyl methacrylate, butyl acrylate, vinyl acetate or styrene. Alternatively, or additionally, the required solubility in the aqueous medium can be achieved by using as a major monomer constituent an acrylic ester containing basic groups, for example dimethylaminoethyl methacrylate or diethylaminoethyl methacrylate, these groups being subsequently converted to salt groups by reaction with a suitable acid, for example lactic acid, dissolved in the aqueous medium. Yet again, the second polymer may be derived from comonomers containing a substantial proporion of a polymerisable carboxylic acid, such as acrylic acid or methacrylic acid, and is then capable of dissolving in an aqueous medium containing a dissolved base, such as dimethylaminoethanol. In general, therefore, the second polymer may be non-ionic, anionic or cationic in character.

Where the polymer microparticles have been made by a process of aqueous emulsion polymerisation as is well known in the art, a second, inherently water-soluble, polymer may be produced by further polymerisation, in the same aqueous medium and in the presence of the microparticles, of monomers giving rise to a polymer which contains acidic salt-forming groups that can confer water-solubility. Thus suitable monomers are polymerisable carboxylic acids such as acrylic acid or methacrylic acid, if desired together with minor proportions of non-hydrophilic monomers such as methyl methacrylate and also of hydrophilic monomers which give rise to water-insoluble homopolymers, e.g. hydroxyethyl methacrylate and hydroxypropyl methacrylate.

In a particular embodiment of the procedure outlined in the preceding paragraphs, the dispersion of polymer microparticles is made by (I) polymerising in an aqueous medium in the presence of a stabiliser a first mixture of ethylenically unsaturated monomers consisting of (i) 98.5–90% by weight of monomers which contain in the molecule a single polymerisable unsaturated grouping; and (ii) 1.5–5% by weight of monomers which contain in the molecule at least two polymerisable unsaturated groupings, whereby a dispersion of particles of crosslinked polymer is produced; and then (II) polymerising in the same medium and in the presence of the said crosslinked particles a second mixture of ethylenically unsaturated monomers consisting of (iii) 10–25% by weight of an unsaturated carboxylic acid;

(iv) 0–30% by weight of a hydroxyl group-containing monomer; and (v) 45–90% by weight of one or more other monomers different from those of (iii) or (iv), thereby producing a non-crosslinked polymer which is capable of forming a water-soluble salt derivative, the crosslinked polymer constituting from 60% to 90% by weight of the total polymer produced in steps (I) and (II), and finally (III) subsequently forming the said salt derivative by neutralising the carboxyl groups present in the non-crosslinked polymer with an inorganic or organic base in the presence of the same aqueous medium.

In this embodiment, the polymerisation may be carried out, for example, according to the procedure described in British Patent Application No. 2 039 497A already referred to, or following the well known technique of aqueous emulsion polymerisation. Monomers of the categories (i)–(v) which are suitable for use in this embodiment include any of those of the respective categories which have already been described above, but particular mention may be made of the following: as monomers (i) or (v), methyl methacrylate, butyl methacrylate, ethyl acrylate, butyl acrylate and 2-ethylhexyl acrylate; as monomers (ii), the diacrylates and dimethacrylates of ethylene glycol, propylene glycol, butanediol and hexanediol, trimethylolpropane triacrylate, divinyl benzene, allyl acrylate, allyl methacrylate, diallyl phthalate, diallyl succinate and triallyl isocyanurate as monomers (iii), acrylic acid, methacrylic acid and itaconic acid; as monomers (iv), hydroxyethyl acrylate, hydroxyethyl methacrylate, hydroxypropyl acrylate, hydroxyisopropyl methacrylate and hydroxybutyl acrylate.

Inorganic or organic bases which are suitable for neutralising the carboxyl groups present in the non-crosslinked polymer include ammonia and the hydroxides of sodium and potassium, triethylamine, dimethylaminoethanol, 2-amino-2-methylpropanol, morpholine and N-methylmorpholine.

Basecoat compositions, in which the constituents (a) and (b) as previously defined are provided by dispersions of polymer microparticles made according to this particular procedure, possess the necessary pseudoplastic or thixotropic character without further modification of the dispersion.

Where the polymer microparticles have been made by a process of dispersion polymerisation in an aqueous medium as described above with reference to our British Patent Application No. 7940088 (published Application No. 2039497A), the second, water-soluble polymer can conveniently be generated by further polymerisation in the same medium of suitable monomers such as those mentioned in the preceding paragraphs and also basic monomers such as dimethylaminoethyl methacrylate, from which water-soluble salt derivatives can be generated.

Instead of generating a suitable water-soluble polymer in situ, or in addition thereto, such a polymer may be added, as a pre-formed separate ingredient, to the aqueous dispersion of the microparticles. Suitable polymers are those which, when dissolved in the aqueous medium even at low concentrations, bring about a considerable enhancement of the viscosity of the composition. For example, there may be added one or more of the thickeners which are well known for use in coating compositions based on aqueous polymer latices. Not all such thickeners are, however, suitable for the present purpose, since some thickeners are not capable of conferring the necessary pseudoplastic properties upon the composition to which they are added. On the other hand, certain thickeners which when alone dissolved in the aqueous medium do not exhibit such properties may confer those properties upon the dispersion of the microparticles through interactions between it and the microparticles (e.g. through hydrogen bonding or interaction of polar groups). One commercially available thickener which has been found to be very suitable is "Acrysol" ASE60, made by Rohm & Haas ("Acrysol" is a Registered Trade Mark).

Whilst it follows that any inherently water-soluble polymer which is associated with the polymer microparticles or is added to the microparticle dispersion, for the purpose of imparting pseudoplastic or thixotropic properties to the dispersion, must of its nature be non-crosslinked, such polymer may nevertheless if desired, be of the crosslinkable type. That is to say, it may contain chemically reactive groups whereby it may be caused, optionally with the aid of an added crosslinking agent, to become crosslinked after application of the basecoat composition, and preferably also of the topcoat composition, to the substrate. Thus the polymer may contain, as already indicated, hydroxyl or carboxyl groups derived from monomers bearing those groups, and may be subsequently crosslinked with the aid of an amino resin, e.g a methylated melamine-formaldehyde condensate, which is soluble in the aqueous medium.

From the foregoing description, it will be seen that the basecoat composition can consist exclusively of the polymer microparticles, the pigment particles, the aqueous medium in which both groups of particles are dispersed, and inherently water-soluble polymer which imparts pseudoplastic properties to it. However, it is much preferred that the composition should also incorporate a film-forming polymer which is soluble in the aqueous medium, in order to ensure that, subsequent to the application of the basecoat to a substrate and evaporation of the aqueous medium, there is material present which can coalesce so as to fill the voids between the microparticles and thus produce a coherent, adequately integrated film in step (2) of the process. This function may indeed be fulfilled by a portion of an inherently water-soluble polymer which is present in the composition, as described above, for the purpose of conferring pseudoplastic or thixotropic properties upon it, but, in view of the generally low proportions of such polymer which is required for that purpose, it may be desirable to supplement it by one or more other water-soluble film-forming materials introduced into the composition, which may optionally be chemically reactive with constituents already present. Thus the composition may contain oligomeric substances which can be converted to high molecular weight products subsequent to application of the composition but which do not in themselves contribute significantly to the viscosity of the composition before application. In this connection there may be mentioned diols of low volatility such as 2-ethyl-1, 3-hexanediol, low molecular weight polypropylene glycols, low molecular weight adducts of ethylene oxide with dihydric or trihydric alcohols such as neopentyl glycol, bisphenol A, cyclohexanedimethanol, glycerol and trimethylolpropane, β-hydroxyalkylamides such as N,N,N$^1$, N$^1$-tetrakis-(β-hydroxyethyl) adipamide and cyclic amides and esters such as ε-caprolactam and ε-caprolactone. Where such materials are not significantly soluble in pure water, they should be soluble in the aqueous medium consisting of water together with the water-miscible organic liquid as previously described. Any of these oligomeric substances can be converted to a high molecular weight polymer, after application of the basecoat composition to the substrate, by linking them through their hydroxyl or other reactive groups by means of a polyfunctional reactant also present in the composition. Particularly useful for this purpose are amino resins soluble in the aqueous medium of the composition, in particular melamineformaldehyde condensates such as hexa (alkoxymethyl) melamines and their low molecular weight condensates.

As an alternative to its containing constituents which produce a film-forming polymer subsequently to its application to the substrate, the basecoat composition may contain a pre-formed water-soluble acrylic polymer which does not confer pseudoplastic properties upon it, or it may contain in dispersion particles of non-crosslinked polymer which are stabilised in a similar fashion to the crosslinked microparticles present. Either of such alternative constituents may, if desired, contain functional groups such as hydroxyl groups whereby they can become crosslinked, after application of the composition to the substrate, by means of a crosslinking agent, e.g. an amino resin.

The relative proportions of the various constituents of the basecoat composition may vary widely and the optimum proportions in any individual system are often best determined by experiment, but some generally guiding principles can be stated. In particular, if the proportion of the polymer microparticles is too high in relation to the other film-forming material present in the composition, as described above, there will not be sufficient of the latter material to fill the voids between the microparticles; in consequence, on subsequent application of the clearcoat composition there will be a tendency for that composition to sink into the basecoat film, with resultant loss of gloss. If, on the other hand, the proportion of microparticles is too low, it may not confer on the basecoat composition the desired degree of protection against attack by the solvent present in the clearcoat composition; to some extent, a lower level of microparticles can be compensated for in this respect by allowing a longer period for the basecoat film to flash off or dry off before the clearcoat is applied, but this diminishes one of the chief advantages to be gained from the present invention. In general, a satisfactory level of the microparticles will lie in the range 5–80% by weight of the total non-volatile content of the basecoat composition. The optimum level depends, however, in some degree upon whether the pigment present in the basecoat composition is metallic or non-metallic. For "metallic" compositions, the preferred range of microparticle content is 40–75% by weight on the foregoing basis. For "solid colour" compositions, because of the generally higher proportions of pigment required in order to achieve adequate opacity at fairly low film thicknesses, the preferred microparticle content range is rather lower, namely 10–50% by weight on the same basis as before. The reduced proportion of microparticles avoids an excessively high total volume fraction of dispersed material which could result in a porous basecoat film and hence sinkage into it, and poor gloss, of the topcoat film.

Again in general terms, it may be stated that the proportions used in the composition of a thickener, or of a second polymer conferring pseudoplastic properties, may range from 0.3% to 50% by weight of the total non-volatile content; the amount present of other film-forming material may be in the range 0–30% by weight and, where a cross-linking agent such as an amino-resin is present, this also may amount to up to 30% by weight of the total non-volatile content of the basecoat composition. The basecoat composition may, if desired, additionally contain a catalyst for any crosslinking reaction which is required to take place after application of the composition to the substrate. This may be a water-soluble acidic compound, such as p-toluenesulphonic acid, orthophosphoric acid, maleic acid or other strong carboxylic acid such as tetrachlorophthalic acid; alternatively, it may be a heat-labile salt of such an acid with a volatile amine.

The nature of the film-forming polymer constituent of the topcoat composition employed in step (3) of the process of the invention is in no way critical. There may in general be used any suitable film-forming polymer, which may be of either the thermosetting or the thermoplastic type. One suitable class of polymer consists of those which are derived from one or more ethylenically unsaturated monomers. Particularly useful members of this class are the acrylic addition polymers which are well-established for the production of coatings in the automobile industry, that is to say polymers of copolymers of one or more alkyl esters of acrylic acid or methacrylic acid, optionally together with other ethylenically unsaturated monomers. Suitable acrylic esters include methyl methacrylate, ethyl methacrylate, propyl methacrylate, butyl methacrylate, ethyl acrylate, butyl acrylate and 2-ethylhexyl acrylate. Suitable other, copolymerisable monomers include vinyl acetate, vinyl propionate, acrylonitrile, styrene and vinyl toluene. Where the acrylic polymer is required to be of the thermosetting crosslinking type, suitable functional monomers to be used in addition to the latter include acrylic acid, hydroxyethyl acrylate, hydroxyethyl methacrylate, 2-hydroxypropyl acrylate, 2-hydroxypropyl methacrylate, N-(alkoxymethyl) acrylamides and N-(alkoxymethyl) methacrylamides, where the alkoxy groups may be, for example, a butoxy group, glycidyl acrylate and glycidyl methacrylate. The topcoat composition may in such a case contain also a crosslinking agent such as a diisocyanate, a diepoxide or, especially, a nitrogen resin, that is to say, a condensate of formaldehyde with a nitrogenous compound such as urea, thiourea, melamine or benzoguanamine, or a lower alkyl ether of such a condensate in which the alkyl group contains from 1 to 4 carbon atoms. Particularly suitable crosslinking agents are melamine-formaldehyde condensates in which a substantial proportion of the methylol groups have been etherified by reaction with butanol.

The topcoat composition may incorporate a suitable catalyst for the crosslinking reaction between the acrylic polymer and the crosslinking agent, for example an acid-reacting compound such as acid butyl maleate, acid butyl phosphate or p-toluene sulphonic acid. Alternatively the catalytic action may be supplied by the incorporation of free acid groups in the acrylic polymer, for example by the use of acrylic acid or methacrylic acid as comonomer in the preparation of the polymer.

The topcoat polymer may be either in solution or in stable dispersion in the volatile carrier liquid of the topcoat composition, in other words, the carrier liquid may be either a solvent or a non-solvent for the topcoat polymer. Where the liquid is to be a solvent, it may be any of the organic liquids, or mixtures of organic liquids, which are conveniently used as polymer solvents in coating compositions, for example aliphatic hydrocarbons such as hexane and heptane, aromatic hydrocarbons such as toluene and xylene, and petroleum fractions of various boiling point ranges which are predominantly aliphatic but have a significant aromatic content, esters such as butyl acetate, ethylene glycol diacetate and 2-ethoxyethyl acetate, ketones such as acetone and methyl isobutyl ketone, and alcohols such as butyl alcohol. The actual liquid or mixture of liquids selected as the carrier liquid will depend upon the nature of the topcoat polymer, according to principles which are well-known in the coatings art, in order that the polymer shall be soluble in the liquid.

Where the carrier liquid is to be an organic non-solvent, it will tend to be of rather lower polarity than those just mentioned and may consist of one or more aliphatic hydrocarbons such as hexane, heptane or petroleum fractions of low aromatic content, optionally in admixture with liquids of high polarity such as have already been referred to, provided that the total mixture is a non-solvent for the topcoat polymer. In such a case, the topcoat composition will be a non-aqueous polymer dispersion, and this will in general be a sterically stabilised dispersion in which the polymer particles are stabilised by means of a block or graft copolymer, one polymeric constituent of which is non-solvatable by that liquid and is associated with the disperse polymer. The well-known principles according to which such dispersions may be prepared have been extensively described in the patent and otherliterature, for example in British Patent Specifications Nos. 941,305; 1,052,241; 1,122,397; and 1,231,614 and in "Dispersion Polymerisation in Organic Media" ed. K. E. J. Barrett (Johh Wiley and Sons, 1975).

Alternatively the topcoat composition may, like the basecoat composition, be water-borne and in this case also the topcoat polymer may be either in solution or in a state of stable dispersion in an aqueous medium. In the case of a dispersion, this may be sterically stabilised, as for example when it has been prepared by an aqueous dispersion polymerisation procedure such as that of British Patent Application No. 7940088 (published Application No. 2039497A) already referred to, or charge-stabilised, as for example when it has been prepared by the well known aqueous emulsion polymerisation techniques. Unlike the polymer microparticles of the basecoat composition, the topcoat polymer will always be of the thermosetting type and hence capable of becoming crosslinked after application to the substrate, optionally with the aid of a crosslinking agent.

Usually, the topcoat composition will be substantially colourless so that the pigmentation effect due to the basecoat is not significantly modified, but it may be desirable in some cases, more usually where the basecoat contains a metallic pigment, to provide a transparent tinting of the topcoat composition.

In the first operational step of the process of the invention, the basecoat composition is applied to the surface of the substrate, which may be previously primed or otherwise treated as conventional in the art. The substrates which are of principal interest in the context of the invention are metals such as steel or aluminium which are commonly used for the fabrication of automobile bodies, but other materials such as glass, ceramics, wood and even plastics can be used provided they are capable of withstanding the temperatures at which final curing of the multilayer coating may be effected. After application of the basecoat composition, a polymer film is formed therefrom upon the surface of the substrate. If desired, this may be achieved by subjecting the substrate and the applied coating to heat in order to volatilise the water and any organic liquid diluent therein, and it lies within the scope of the invention to employ a heating temperature sufficient to crosslink the basecoat film in those cases where the composition contains a film-forming material of the thermosetting type. However, a particular merit of the present invention is that it is sufficient to allow only a short period of drying in order to ensure that the topcoat composition can be applied to the basecoat film without there being any tendency for the former to mix with or dissolve the latter in a way which can, for example, interfere with the correct orientation of metallic pigmentation, whereby optimum "flip" effect is achieved. Suitable drying conditions in any individual case will depend, inter alia, on the ambient humidity but in general a drying time of from 1 to 5 minutes at a temperature of from 15° to 80° C. will be adequate to ensure that mixing of the two coats is prevented. At the same time, the basecoat film is adequately wetted by the topcoat composition, so that satisfactory inter-coat adhesion is obtained.

After application of the topcoat composition to the basecoat film, the coated substrate may be subjected to a heating or curing operation in which the volatile carrier liquid of the topcoat is driven off and optionally in which the film-forming material of the topcoat and/or that of the basecoat, is crosslinked with the aid of the crosslinking agent(s) present. This heating or curing operation is usually carried out at a temperature in the range 100°-140° C., but if desired, a lower temperature than this may be employed provided it is sufficient to activate any necessary crosslinking mechanism.

In performing the process of the invention, the basecoat and topcoat compositions may be applied to the substrate by any of the conventional techniques such as brushing, spraying, dipping or flowing, but it is preferred that spray application be used since the best results are thereby achieved in regard to both pigment control, especially of metallic pigment orientation, and gloss. Any of the known spray procedures may be adopted, such as compressed air spraying, electrostatic spraying, hot spraying and airless spraying, and either manual or automatic methods are suitable.

The thickness of the basecoat film applied is preferably from 0.5 to 1.5 mils and that of the topcoat from 1 to 3 mils (dry film thickness in each case).

As will be apparent from the foregoing description, the advantage of the invention, so far as "glamour metallic" finishes are concerned, is the provision of a basecoat/clearcoat system in which atmospheric pollution drawbacks are eliminated or much reduced by the use of a water-borne basecoat composition, without the sacrificing of good control of the orientation of the metallic pigmentation. Where "solid color" finishes are concerned, control of the orientation of the pigment is, of course, no longer a significant factor, but it remains an advantage that the basecoat film is not disturbed by the subsequent application of the topcoat composition and it is also found that the basecoat film is much less subject to the effect known as "popping" than is a water-borne coating which does not contain the polymer microparticles.

The invention is illustrated but not limited by the following Examples, in which parts and percentages are by weight. In these Examples, the quoted apparent viscosity values $\eta_a$ of basecoat compositions were determined using two different instruments. The values of $\eta_a$ at 10,000 sec $^{-1}$ shear rate were measured using the ICI Cone and Plate Viscometer in the modification designed to cover the viscosity range 0-2.0 poise at the shear rate in question. This instrument is described in Journal of the Oil and Colour Chemists' Association, July, 1966, in an article by C. H. Monk and is manufactured by Research Equipment (London) Limited.

The values of $\eta_a$ at 1.0 sec $^{-1}$ shear rate were measured using a "Rheomat 30" concentric cylinder viscometer with 'A' cup and bob; each sample was subjected to an applied shear rate of 660 sec $^{-1}$ until a constant shear stress reading was obtained, after which the shear rate was immediately changed to 1.0 sec $^{-1}$, the shear stress measured and the viscosity calculated from these data. The "Rheomat 30" is manufactured by Contraves AG of Zurich; "Rheomat" is a Registered Trade Mark.

EXAMPLE 1

A. Preparation of dispersion of polymeric microparticles in aliphatic hydrocarbon To a reactor fitted with stirrer, thermometer, reflux condenser and provision for adding monomer to the returning distillate was charged 35.429 parts of heptane. The latter was heated to reflux temperature (95°-96° C.) and the following premixed ingredients were then added:

| Methyl methacrylate | 5.425 parts |
| Azodiisobutyronitrile | 0.420 part |
| Graft copolymer stabiliser (33% solution as described below) | 1.984 parts |

The contents of the reactor were held at reflux temperature for 30 minutes so as to form a "seed" dispersion of polymer, after which the following premixed ingredients were fed into the returning distillate at a steady rate over a period of 3 hours:

| methyl methacrylate | 25.000 parts |
| allyl methacrylate | 0.775 part |
| azodiisobutyronitrile | 0.338 part |
| graft copolymer stabiliser (33% solution as described below) | 5.316 parts |

After completion of the feed, the contents of the reactor were held at reflux temperature for a further 1 hour, following which 12.874 parts of heptane was added and refluxing resumed. The following premixed ingredients were fed into the reactor via the returning distillate at a steady rate over 1 hour:

| methyl methacrylate | 3.883 parts |
| butyl acrylate | 3.066 parts |
| hydroxyethylacrylate | 2.044 parts |
| acrylic acid | 1.226 parts |
| azodiisobutyronitrile | 0.071 part |
| graft copolymer stabiliser (33% solution as described below) | 2.149 parts |

Following completion of this feed, the reaction mixture was held at reflux temperature for 1 hour. A stable dispersion of crosslinked polymer microparticles was obtained having a total non-volatile solids content of 43.5-44.5% and a content of non-volatile solids insoluble in any polar solvent (viz. gel content) of 34.5-35%.

The graft copolymer stabiliser used in the above procedure was obtained as follows. 12-Hydroxystearic acid was self-condensed to an acid value of about 31-34 mg KOH/g (corresponding to a molecular weight of 1650-1800) and then reacted with an equivalent amount of glycidyl methacrylate. The resulting unsaturated ester was copolymerised at a weight ratio of 2:1 with a mixture of methyl methacrylate and acrylic acid in the proportions of 95:5. The copolymer was used as a 33% solution in a mixture of ethyl acetate 11.60%, toluene 14.44%, aliphatic hydrocarbon b.p. 98°-122° C. 61.29% and aliphatic hydrocarbon b.p. 138°-165° C. 12.67%.

B. Transfer of the polymer microparticles to dispersion in aqueous medium

To a reactor fitted with stirrer, thermometer and means for removing volatile solvent by distillation was charged:

| | |
|---|---|
| demineralised water | 72.308 parts |
| butoxyethanol | 10.332 parts |
| dimethylaminoethanol | 0.529 part |

The contents of the reactor were heated to 100° C. and 46.497 parts of the microparticle dispersion from stage A were then fed in at such a rate that the heptane contained in the dispersion was removed by distillation without building up any significant concentration in the contents of the reactor. The time required to do this was about 2 hours and the distillate, consisting mainly of heptane with some water, amounted to 29–30 parts.

The product was a stable aqueous dispersion of the polymer microparticles having a non-volatile solids content of 20–22% and a pH of 7.2–7.5.

C. Preparation of aluminum pigment concentrate

To a stirred mixing vessel was charged:

| | |
|---|---|
| aluminium paste (metal content, 65%) | 5.8 parts |
| butoxyethanol | 2.9 parts |

These ingredients were stirred together for 15 minutes and a further 2.9 parts of butoxyethanol was then added at a steady rate over 30 minutes, following which the mixture was stirred for a further 1 hour. There was then added 4.84 parts of hexamethoxymethylmelamine and stirring was continued for 1 hour; finally, a further 1.93 parts of hexamethoxymethylmelamine and 0.97 part of butoxyethanol were added and the mixture was stirred for 1 hour more.

D. Preparation of basecoat composition

The following ingredients:

| | |
|---|---|
| aluminium concentrate from stage C | 19.34 parts |
| microparticle dispersion from stage B | 79.61 parts |
| hexamethoxymethylmelamine | 0.46 part |
| dimethylaminoethanol salt of p-toluenesulphonic acid, 10% solution in demineralised water, | 3.57 parts | were stirred together for 1 hour. The basecoat composition thus obtained had the following characteristics:
Solids content: 27.2%
Apparent viscosity $\eta_a$:
 35 poise at shear rate $D = 1$ sec$^{-1}$
 0.06 poise approx. at shear rate $D = 10{,}000$ sec$^{-1}$.

E. Preparation of acrylic polymer for clearcoat composition

To a reactor fitted with stirred, thermometer and reflux condenser was charged:

| | |
|---|---|
| xylene | 22.260 parts |
| aromatic hydrocarbon | 10.000 parts |
| b.p. 190–210° C. | |

The mixture was heated to reflux temperature (142°–146° C.) and the following premixed ingredients were added at a steady rate over 3 hours:

| | |
|---|---|
| styrene | 21.49 parts |
| ethyl acrylate | 4.51 parts |
| 2-ethylhexylacrylate | 13.75 parts |
| hydroxyethyl acrylate | 10.05 parts |
| acrylic acid | 0.49 parts |
| cumene hydroperoxide | 1.41 parts |

The reactants were held at reflux temperature for a further 2 hours, after which there was added:

| | |
|---|---|
| isobutyl alcohol | 12.72 parts |
| xylene | 3.32 parts |

A clear solution of polymer was thus obtained, having a solids content of 50%.

E. Preparation of solvent-borne clearcoat composition

The following ingredients were blended together:

| | |
|---|---|
| polymer solution from stage E | 53.3 parts |
| butylated melamine-formaldehyde resin, 67% solution in butanol | 26.5 parts |
| dipentene | 5.0 parts |
| flow-promoting polymer, 10% solution in xylene | 0.1 part |
| isobutyl alcohol | 2.0 parts |
| xylene | 13.1 parts |

A clear solution of 44.4% solids was obtained. It had a viscosity of 40 secs. (B.S. B4 cup at 25° C.).

G. Application of basecoat and clearcoat to a substrate.

A metal panel was prepared with primer and surfacer, then two coats of the metallic basecoat composition described in stage D were applied by spray, without further thinning, at a temperature of 22° C. and a relative humidity of 39%. A two-minute flash-off period was allowed between the coats; the paint flow rate at the spray gun was 400 mls/minute.

After application of the second basecoat the panel was blown with air at 25° C. and two coats of clearcoat composition as described in stage F were applied, the clearcoat composition having been thinned beforehand with xylene to a viscosity of 45 secs (B.S. B3 cup at 25° C.). The two coats were applied wet on wet with a two-minute flash-off period between the coats. After a final three-minute flash-off, the panel was stoved at 125°–130° C. for 30 minutes.

The resulting silver metallic coating had excellent 'flip' and absence of 'shear', and was equivalent in appearance to finishes of the highest degree of 'flip' obtained from a completely solvent-borne paint system. The gloss and intercoat adhesion were good and there was no sinkage of the clearcoat into the basecoat.

EXAMPLE 2

A metal panel was prepared with primer and surfacer, then two coats of the metallic basecoat composition described in stage D of Example 1 were applied by spray, without further thinning, at a temperature of 25° C. and a relative humidity of 58%. A two-minute flash-off period was allowed between the coats; the paint flow rate at the spray gun was 400 mls/minute.

After application of the second basecoat, the panel was dried at 35°-42° C. for 10 minutes and there were then applied two coats of the clearcoat composition described in stage F of Example 1, the clearcoat having beem thinned beforehand with xylene to a viscosity of 45 seconds (B.S. B3 cup at 25° C.). The two coats were applied wet-on-wet with a two-minute flash-off period between the coats. After a final three-minute flash-off, the panel was stoved at 125°-130° C. for 30 minutes.

The coating thus obtained had the same excellent characteristics as that described in Example 1.

EXAMPLE 3

A. Preparation of aqueous dispersion of polymer microparticles

The following premixes were prepared:

| | | |
|---|---|---|
| (i) Monomer premix | | |
| methyl methacrylate | 18.350 | parts |
| allyl methacrylate | 1.340 | parts |
| styrene | 4.700 | parts |
| butyl acrylate | 18.800 | parts |
| methacrylic acid | 1.410 | parts |
| prim-octyl mercaptan | 0.159 | part |
| ammonium salt of sulphate of (nonylphenol + 5 mols. ethylene oxide) | 0.185 | part |
| (ii) Initiator solution | | |
| ammonium persulphate | 0.130 | part |
| demineralised water | 4.010 | parts |
| (iii) Surfactant solution | | |
| methyl methacrylate | 20.000 | parts |
| ammonium salt of sulphate of (nonylphenol + 5 mols. ethylene oxide) | 20.000 | parts |

To a reactor, fitted with stirrer, thermometer, reflux condenser and means for controlled introduction of two separate liquid feeds, was charged:

| | | |
|---|---|---|
| demineralised water | 47.641 | parts |
| surfactant solution (iii) | 0.100 | part |

The charge was heated to 80°-85° C., then 2.000 parts of monomer premix (i) were added and the mixture held at 80°-85° C. for 15 minutes. There was then added 1.068 parts of initiator solution (ii) and the reaction mixture was held at the same temperature for 20 minutes. The following premixed ingredients were then fed in at a steady rate over 5 hours:

| | | |
|---|---|---|
| monomer premix (i) | 42.944 | parts |
| hydroxyisopropyl methacrylate | 2.350 | parts |

Over the same 5-hour period, 3.672 parts of initiator solution (ii) was fed in separately at a constant rate. Thereafter the reaction mixture was kept at 80°-85° C. for 1 hour and then cooled to room temperature, giving a stable aqueous dispersion of crosslinked polymer microparticles. The dispersion had a total solids content of 46.6% and a conteant of non-volatile solids insoluble in any organic solvent of 44.5%.

B. Preparation of basecoat composition

Premix (iv)

2.563 parts of the commercial thickener known as "Acrysol" ASE 60 ("Acrysol" is a Registered Trade Mark of Rohm & Haas Company) was stirred with sufficient of a 25% solution of dimethylaminoethanol in demineralised water to bring the pH to 7.65. Further demineralised water was then added to a total of 23.956 parts.

Premix (v)

A blend of 29.299 parts of the microparticle dispersion from stage A above and 18.614 parts of demineralised water was brought to a pH of 7.65 by addition of sufficient of a 25% solution of dimethylaminoethanol in demineralised water. There was then blended in 23.956 parts of premix (iv) prepared as described above.

To a stirred mixer were charged:

| | |
|---|---|
| aluminium paste (metal content, 65%) | 5.133 parts |
| 2-butoxyethanol | 15.193 parts |

The charge was stirred for 15 minutes, then the following were added:

| | |
|---|---|
| hexamethoxymethyl melamine | 3.696 parts |
| polypropylene glycol (average mol. wt. 400) | 2.464 parts | and stirring continued for a further 1 hour. Thereafter there were added:

| | |
|---|---|
| premix (v) | 71.869 parts |
| demineralised water | 1.623 parts | and stirring continued for 1 hour more. The basecoat composition thus obtained had the following characteristics:

solids content: 20.5%
apparent viscosity $\theta_a$:
  34.6 poise at shear rate $D = 1$ sec$^{-1}$
  0.42 poise at $D = 10,000$ sec$^{-1}$ C. Prepartion of acrylic polymer for clearcoat composition To a reactor fitted with stirrer, thermometer and reflux condenser was charged 42.20 parts of isopropanol. This was heated to reflux temperature (84° C.) and the following premixed ingredients were then added to a steady rate over 3 hours:

| | | |
|---|---|---|
| methyl methacrylate | 19.85 | parts |
| butyl acrylate | 24.80 | parts |
| hydroxyethyl methacrylate | 2.48 | parts |
| acrylic acid | 2.48 | parts |
| isopropanol | 7.45 | parts |
| benzoyl peroxide (60% paste in dimethyl phthalate) | 0.74 | part |

The reactants were maintained at reflux temperature for a further 2 hours. There was obtained a polymer solution of 50% solids content. From this there was removed, by direct distillation, 28.87 parts of isopropanol and to the residue there was added, with stirring, 1.86 parts of dimethylaminoethanol followed by 80.35 parts of demineralised water. Distillation of the azeotrope of isopropanol and water was then continued up to a temperature of 96°–98° C., further demineralised water being added to replace the distillate. The total amount of distillate removed was 118.83 parts and the total amount of further demineralised water added was 114.65 parts. There was thus obtained an aqueous solution of acrylic polymer having a solids content of 33.5%.

D. Preparation of water-born clearcoat composition

The following ingredients were blended together:

| | |
|---|---|
| polymer solution from stage C above | 75.16 parts |
| hexamethoxymethylmelamine | 6.29 parts |
| butoxyethanol | 12.26 parts |
| demineralised water | 5.50 parts |
| dimethylaminoethanol salt of p-toluenesulphonic acid (pH 7.6) | 0.79 part |

The clearcoat composition thus obtained had a solids content of 31.5% and a viscosity of 0.5 poise.

E. Application of basecoat and clearcoat to a substrate

A metal panel was prepared with primer and surfacer, then three coats of the metallic basecoat composition described in stage B above were applied by spray, without further thinning, at a temperature of 25° C. and a relative humidity of 51%. A one-minute flash-off period was allowed between the coats; the paint flow rate at the spray gun was 400 mls/minute.

After the application of the third basecoat, the panel was dried at 35°–42° C. for 10 minutes and thee were then applied three coats of the clearcoat composition described in stage D above. The three coats were applied wet-on-wet with a two-minute flash-off period between the coats and a final 3minute flash-off period. The panel was then pre-heated at 70° C., followed by stoving at 150° C. for 30 minutes.

The coating thus obtained had excellent 'flip' and freedom from shear and was equivalent in appearance to the best completely solvent-born metallic paint system. Gloss and intercoat adhesion were good and there was no sinkage of the clearcoat into the basecoat.

EXAMPLE 4

Preparation of aqueous dispersion of polymer microparticles

To a reactor fitted with stirrer, thermometer, reflux condenser and means for controlled introduction of two separate liquid feeds, was charged:

| | |
|---|---|
| demineralised water | 29.030 parts |
| followed by a premixed blend of methyl methacrylate | 0.029 part |
| ammonium salt of sulphate of (nonylphenol + 5 mols. ethylene oxide) | 0.029 part |

The contents of the reactor were heated to 80°–85° C. with stirring and the following pre-mixed ingredients were added:

| | |
|---|---|
| butyl acrylate | 0.069 part |
| methyl methacrylate | 0.069 part | the reaction mixture was held at 80°–85° C. for 15 minutes, following which there was added a blend of:

| | |
|---|---|
| demineralised water | 0.67 part |
| ammonium persulphate | 0.021 part |

After the contents of the reactor had been held at 80°–85° C. for a further 20 minutes, the following premixed ingredients were fed into the reactor at a constant rate over 3 hours:

| | |
|---|---|
| butyl acrylate | 10.758 parts |
| methyl methacrylate | 10.189 parts |
| allyl methacrylate | 0.686 part |
| ammonium salt of sulphate of (nonylphenol + 5 mols. ethylene oxide) | 0.081 part | and simultaneously there were fed into the reactor at a steady rate, over the same period 3 hours, solution of 0.037 part of ammonium persulphate in 4.985 parts of demineralised water.

After completion of the above feeds, the contents of the reactor were held at 80°–85° C. for 1 hour. There was then added 34.716 parts of demineralised water and the temperature was brought back to 80°–85° C.; the following pre-mixed ingredients were then added at a constant rate over a period of 1 hour:

| | |
|---|---|
| methacrylic acid | 0.950 part |
| butyl acrylate | 2.035 parts |
| hydroxyethyl acrylate | 1.357 parts |
| methyl methacrylate | 0.950 part |
| ammonium salt of sulphate of (nonylphenol + 5 mols. ethylene oxide) | 0.028 part | and simultaneously, at a steady rate over the same period of 1 hour, there was fed into the reactor a solution of 0.019 part of ammonium persulphate and 0.016 part of sodium borate in 0.596 part of demineralised water. At the completion of both feeds, the temperature of the reaction mixture was held at 80°–85° C. for 1 hour, after which it was rapidly cooled to give a stable aqueous dispersion of polymer microparticles. The dispersion had a total non-volatile solids content of 30% and a content of non-volatile solids insoluble in organic solvents of 27%.

B. Preparation of basecoat composition

The dispersion obtained from stage A was brought to pH 8.0 by addition of dimethylaminoethanol, and 54.15 parts of this was charged to a mixer. There was then added, in the order stated, the following ingredients:

| | |
|---|---|
| demineralised water | 18.91 parts |
| butoxyethanol | 8.12 parts |
| aluminium pigment concentrate (as described in Example 1(C).) | 18.02 parts |

The mixture was stirred for 1 hour, to give a basecoat composition having the following characteristics:
solids content: 25.8%
apparent viscosity $\eta_a$:
  20 poise at shear rate $D = 1 \text{ sec}^{-1}$
  0.2 poise at shear rate $D = 10,000 \text{ sec}^{-1}$ The polymer microparticles in this product had the following monomer composition:

| Crosslinked polymer | |
|---|---|
| Methyl methacrylate | 47.2% |
| Butyl acrylate | 49.6% |
| Allyl methacrylate | 3.2% |
| Non-crosslinked polymer | |
| Methacrylic acid | 17.9% |
| Hydroxyethyl acrylate | 25.7% |
| Methyl methacrylate | 17.9% |
| Butyl acrylate | 38.5% |

The crosslinked polymer and the non-crosslined polymer constituted 80.4% and 19.6% respectively of the total microparticle polymer.

C. Application of basecoat and clearcoat to a substrate

To a metal panel prepared with primer and surfacer there was applied by spray, without further thinning, two coats of the metallic basecoat composition described in stage B above, at a temperature of 22° C. and a relative humidity of 39%. The clearcoat composition subsequently applied was that described in stage F of Example 1, and the procedure for application of both the basecoat and the clearcoat compositions was otherwise the same as that described in stage G of Example 1.

The results obtained were similar to those described in stage G of Example 1.

COMPARATIVE EXAMPLE A

A. Preparation of silver metallic basecoat without microparticles

To a stirrer mixer were charged:

| aluminium paste (metal content, 65%) | 6.0 parts |
|---|---|
| 2-butoxyethanol | 18.7 parts |

The charge was stirred for 30 minutes, then the following were added:

| hexamethoxymethylmelamine | 4.3 parts |
|---|---|
| polypropylene glycol (average mol. wt. 400) | 2.9 parts | and stirring continued for a further 1 hour. There were then added, with stirring over a period of 30 minutes, 51.2 parts of 33.5% solids aqueous solution of acrylic polymer made as described in Example 5(c) below, followed by addition of 16.9 parts of demineralised water.

A basecoat composition was thus obtained which had the same pigment:binder ratio, the same ratio of hexamethoxymethylmelamine to total non-volatile matter and a very similar value (0.3 poise) of the apparent viscosity $\eta_a$ at $D=10,000$ sec$^{-1}$ as are quoted in Example 1 for a basecoat composition according to the invention. Thge apparent viscosity at high shear rate of the composition containing no polymer microparticles indicated that it was suitable for application by spraying on to a substrate; but its apparent viscosity at low shear rate, viz. $D=1$ sec$^{-1}$, was found to be approximately 1.0 poise only, showing that the composition had only slight pseudoplastic or thixotropic properties.

The basecoat composition was applied to a panel and overcoated with an acrylic clearcoat composition in the manner described in Example 1(G), the clearcoat composition employed being that described in Example 1(E) and (F). The silver metallic coating so obtained had a very poor 'flip' and exhibited patches of shear'. It was also subject to 'popping during the stoving operation.

Examples 1-4 illustrates the invention as applied to the production of "glamor metallic"]finishes. In the following Example, its application to "solid colour" finishes is illustrated.

EXAMPLE 5

A. Preparation of white pigment millbase

The following ingredients were ground together in a ball mill for 16 hours:

| Titanium dioxide pigment | 31.3 parts |
|---|---|
| 2-Butoxyethanol | 18.9 parts |
| Demineralised water | 18.9 parts |
| Dimethylaminoethanol | 0.2 part |
| Hexamethoxymethylmelamine | 7.7 parts |

The resulting millbase, which had a particle size of less than 0.5 micron, was then diluted with 11.6 parts of 2-butoxyethanol and 11.6 parts of demineralised water.

B. Preparation of blue pigment millbase

The following ingredients were ground together in a ball mill for 16 hours:

| Phthalocyanine blue pigment | 12.9 parts |
|---|---|
| 2-Butoxyethanol | 23.8 parts |
| Demineralised water | 23.8 parts |
| Dimethylaminoethanol | 0.2 part |
| Hexamethoxymethylmelamine | 9.7 parts |

The resulting millbase, which had a particle size of less than 0.5 micron, was then diluted with 14.8 parts of 2-butoxyethanol and 14.8 parts of demineralised water.

C. Preparation of aqueous solution of acrylic polymer

The following ingredients were blended:

| Methyl methacrylate | 19.9 parts |
|---|---|
| Butyl acrylate | 24.8 parts |
| Hydroxyethyl methacrylate | 2.5 parts |
| Acrylic acid | 2.5 parts |
| Isopropanol | 7.4 parts |
| Benzoyl peroxide | 0.7 parts |

A mixture of 15.0 parts of the above blend and 42.2 parts of isopropanol was charged to a flask fitted with stirrer, thermometer, reflux condenser and means for adding a liquid feed at a controlled rate. The contents of the flask were heated to reflux temperature (84° C.) and the remainder of the above blend (42.8 parts) was added to them at a steady rate over a period of 3 hours. The reaction mixture was heated under reflux for a further 2 hours, to give a polymer solution of 51.0% solids content. To the solution there was then added 1.8 parts of dimethylaminoethanol, the mixture was re-heated to reflux temperature and, with the condenser re-arranged, distillate was removed to a total of 33.0 parts while 85.0 parts of demineralised water were added, over a period of 10 hours. The finally resulting aqueous solution of acrylic polymer had a solids content of 33.5%.

Preparation of blue basecoat composition

The following ingredients were mixed in the order stated:

| | |
|---|---|
| White millbase as described in (A), above | 52.25 parts |
| Blue millbase as described in (B), above | 8.39 parts |
| Microparticle dispersion as described in Example 1(B) | 14.62 parts |
| Solution of acrylic polymer as described in (C) above | 24.33 parts |
| 10% aqueous solution of p-toluene-sulphonic acid brought to pH 7.6 by addition of dimethylamino-ethanol | 0.41 part |

The resulting basecoat composition exhibited a viscosity of 16.0 poise at a shear rate of 1 sec$^{-1}$ and of 0.53 poise at a shear rate of 10,000 sec$^{-1}$.

E. Application of basecoat and clearcoat to a substrate.

A metal panel was prepared with primer and surfacer, then two coats of the blue basecoat composition described in (D) above were applied by spray, without further thinning, at a temperature of 22° C. and a relative humidity of 39%. A two-minute flash-off period was allowed between the coats. After application of the second basecoat, the panel was blown with air at 25° C. and two coats of the clearcoat composition as described in Example 1(F) were applied, the clearcoat composition having been thinned beforehand with xylene to a viscosity of 45 secs measured in a B.S. B3 cut at 25° C. The two topcoats were applied wet-on-wet with a two-minute flash-off between coats. After a final three-minute flash-off, the panel was stoved at 125°–130° C. for 30 minutes.

The resulting coating had good opacity and gloss and there was no sinkage of the clearcoat into the basecoat.

COMPARATIVE EXAMPLE B

A. Preparation of blue basecoat composition without polymer microparticles

The following ingredients were mixed in the order stated:

| | |
|---|---|
| White millbase as described in Example 5(A) | 54.8 parts |
| Blue millbase as described in Example 5(B) | 8.8 parts |
| Hexamethoxymethylmelamine | 0.3 part |
| Solution of acrylic polymer as described in Example 5(C) | 35.7 parts |
| 10% aqueous solution of p-toluene-sulphonic acid, brought to pH 7.6 by addition of dimethylamino-ethanol | 0.4 part |

The resulting basecoat composition exhibited a viscosity of 1.0 poise at a shear rate of 1 sec$^{-1}$ and of 0.83 poise at a shear rate of 10,000 sec$^{-1}$; that is to say, it possessed very little pseudoplastic or thixotropic character.

B. Application of basecoat and clearcoat to a substrate

The procedure of Example 5(E) was repeated, but replacing the basecoat composition described in Example 5(D) by the basecoat described in (A) above. In this case, considerable "popping" of the basecoat was observed, that is to say, air entrained in the basecoat separated as bubbles, deforming the surface of the film and damaging its smooth appearance. Furthermore, a longer period than three minutes had to be allowed between the application of the second basecoat and that of the first clearcoat, otherwise the basecoat was disturbed by the clearcoat with a deleterious effect upon the final appearance of the panel.

EXAMPLE 6

A. Preparation of aqueous dispersion of polymer microparticles

To a reactor fitted with stirrer, thermometer, reflux condenser and means for controlled introduction of two separate liquid feeds, was charged:

| | |
|---|---|
| demineralised water | 55.126 parts |
| followed by | |
| ammonium salt of sulphate of (nonylphenol + 5 mols. ethylene oxide) | 0.233 part |

The contents of the reactor were heated to 80°–85° C. with stirring and the following pre-mixed ingredients were added:

| | |
|---|---|
| butyl acrylate | 0.522 part |
| methyl methacrylate | 0.482 part | the reaction mixture was held at 80°–85° C. for 15 minutes, following which there was added a blend of:

| | |
|---|---|
| demineralised water | 0.519 part |
| ammonium persulphate | 0.016 part |

After the contents of the reactor had been held at 80°–85° C. for a further 20 minutes, the following pre-emulsified ingredients were fed into the reactor at a constant rate over 3 hours:

| | |
|---|---|
| butyl acrylate | 8.392 parts |
| methyl methacrylate | 7.896 parts |
| allyl methacrylate | 0.535 part |
| ammonium salt of sulphate of (nonylphenol + 5 mols. ethylene oxide) | 0.145 part |
| demineralised water | 10.575 parts | and simultaneously there wass fed into the reactor at a steady rate, over the same period of 3 hours, a solution of 0.029 part of ammonium persulphate in 3.858 parts of demineralised water.

After completion of the above feeds, the contents of the reactor were held at 80°–85° C. for 1 hour; the following pre-mixed ingredients were then added at a constant rate over a period of 1 hour:

| | |
|---|---|
| methacrylic acid | 0.735 part |
| butyl acrylate | 3.463 parts |
| hydroxyethyl acrylate | 1.050 parts |
| ammonium salt of sulphate of (nonylphenol + 5 mols. ethylene oxide) | 0.091 part |
| demineralised water | 5.854 parts | and simultaneously, at a steady rate over the same period of 1 hour, there was fed into the reactor a solution of 0.015 part of ammonium persulphate and 0.013 part of sodium borate in 0.461 part of demineralised water. On the completion of both feeds, the temperature of the reaction mixture was held at 80°–85° C. for 1 hour, after which it was rapidly cooled to give a stable aqueous dispersion of polymer microparticles. The dispersion had a total non-volatile solids content of 21.4% and a content of non-volatile solids insoluble in organic solvents of 17.3%.

B. Adjustment of pH of aqueous dispersion

To a stirred vessel were added:

| Dispersion from stage A above | 93.230 parts |
| Demineralised water | 2.169 parts |
| Formalin solution | 0.643 part |

The content of the vessel were heated to 90°–95° C. and a mixture of

| Demineralised water | 3.442 parts |
| triethylamine | 0.516 part | was added over 20 minutes. The total charge was held at 90°–95° C. for two hours and then cooled. The dispersion obtained had the following properties:
pH: 7.0
solids content: 18.74%

C. Preparation of aluminium pigment concentrate

To a stirred mixing vessel was charged:

| aluminium paste (metal content, 65%) | 25.0 parts |
| butoxyethanol | 15.0 parts |

These ingredients were stirred together for 15 minutes and a further 45.6 parts of butoxyethanol was then added at a steady rate over 30 minutes, following which the mixture was stirred for a further 1 hour. There was then added 22.4 parts of melamine resin ("Cymel" 325) and stirring was continued for 1 hour; finally, 12.0 parts of polypropylene glycol (average molecular weight 400) and 10 parts of a 5% solution of triethylamine in demineralised water were added and the mixture was stirred for 1 hour more.

D. Preparation of basecoat composition

The following ingredients:

| aluminium concentrate from stage C | 130.00 parts |
| microparticle dispersion from stage B | 327.56 parts |
| triethylamine, 50% solution in demineralised water | 17.03 parts |
| demineralised water | 53.71 parts | were stirred together for 1 hour. The basecoat composition thus obtained had the following characteristics:
Solids content: 22.0%
Apparent viscosity $\eta_a$:
 11.2 poise at shear rate $D = 1$ sec$^{-1}$
 0.20 poise approx. at shear rate $D = 10,000$ sec$^{-1}$.
pH: 8:1

The polymer microparticles in this product had the following monomer composition:

| Crosslinked polymer | |
|---|---|
| Methyl methacrylate | 47.0% |
| Butyl acrylate | 50.0% |
| Allyl methacrylate | 3.0% |
| Non-crosslinked polymer | |
| Methacrylic acid | 14.0% |
| Hydroxyethyl acrylate | 20.0% |
| Butyl acrylate | 66.0% |

The crosslinked polymer and the non-crosslinked polymer constituted 77.3% and 22.7% respectively of the total microparticle polymer.

E. Application of basecoat and clearcoat to a substrate

The basecoat composition described in stage D above was applied to a prepared metal panel in the manner shown in stage C of Example 4. A clearcoat composition as described in stage F of Example 1 was subsequently applied and the procedure of stage G of Example 1 then followed.

The results obtained were similar to those described in stage G of Example 1.

EXAMPLE 7

A. Preparation of aqueous dispersion of polymer microparticles

To a reactor fitted with stirrer, thermometer, reflux condenser and means for controlled introduction of two separate liquid feeds, was charged:

| demineralised water | 63.553 parts |
| followed by | |
| ammonium salt of sulphate of (nonylphenol + 5 mols. ethylene oxide) | 0.286 part |

The contents of the reactor were heated to 80°–85° C. with stirring and the following pre-mixed ingredients were added:

| butyl acrylate | 0.669 part |
| methyl methacrylate | 0.617 part | the reaction mixture was held at 80°–85° C. for 15 minutes, following which there was added a blend of:

| demineralised water | 0.665 part |
| ammonium persulphate | 0.021 part |

After the contents of the reactor had been held at 80°–85° C. for a further 20 minutes, the following pre-mixed ingredients were fed into the reactor at a constant rate over 3 hours:

| butyl acrylate | 10.753 parts |
| methyl methacrylate | 10.118 parts |
| allyl methacrylate | 0.686 part |
| ammonium salt of sulphate of (nonylphenol + 5 mols. ethylene oxide) | 0.185 part | and simultaneously there was fed into the reactor at a steady rate, over the same period of 3 hours, a solution of 0.037 part of ammonium persulphate in 4.943 parts of demineralised water.

After completion of the above feeds, the contents of the reactor were held at 80°-85° C. for 1 hour. The following pre-mixed ingredients were then added at a constant rate over a period of 1 hour:

| methacrylic acid | 1.345 parts |
|---|---|
| butyl acrylate | 4.034 parts |
| hydroxyethyl acrylate | 1.345 parts |
| ammonium salt of sulphate of (nonylphenol + 5 mols. ethylene oxide) | 0.117 part | and simultaneously, at a steady rate over the same period of 1 hour, there was fed into the reactor a solution of 0.019 part of ammonium persulphate and 0.016 part of sodium borate in 0.591 part of demineralised water. At the completion of both feeds, the temperature of the reaction mixture was held at 80°-85° C. for 1 hour, after which it was rapidly cooled to give a stable aqueous dispersion of polymer microparticles. The dispersion had a total non-volatile solids content of 29.24% and a content of non-volatile solids insoluble in organic solvents of 23.4%.

B. Adjustment of pH of aqueous dispersion

To a stirred vessel were added:

| dispersion from stage A | 69.87 parts |
|---|---|
| demineralised water | 12.22 parts |
| formalin solution | 0.70 part |

The contents of the vessel were heated to 90°-95° C. and a mixture of

| demineralised water | 16.58 parts |
|---|---|
| triethylamine | 0.64 part | was added over 20 minutes. The total charge was held at 90°-95° C. for two hours and then cooled. The resulting dispersion had the following properties:

| pH | 6.9 |
|---|---|
| solids content | 21.01% |

C. Preparation of aluminium pigment concentrate

To a stirred mixing vessel was charged:

| aluminium paste (metal content, 65%) | 25.0 parts |
|---|---|
| butoxyethanol | 15.0 parts |

These ingredients were stirred together for 15 minutes and a further 73.45 parts of butoxyethanol was then added at a steady rate over 30 minutes, following which the mixture was stirred for a further 1 hour. There was then added 22.5 parts of melamine resin ("Cymel" 325) and stirring was continued for 1 hour; finally, 12.0 parts of polypropylene glycol (average molecular weight 400) and 17.0 parts of a 5% solution of triethylamine in demineralised water were added and the mixture was stirred for 1 hour more.

D. Preparation of basecoat compositon

The following ingredients:

| aluminium concentrate from stage C | 164.95 parts |
|---|---|
| microparticle dispersion from stage B | 333.17 parts |
| triethylamine, 50% solution in demineralised water | 23.62 parts |
| demineralised water | 161.56 parts | were stirred together for 1 hour. The basecoat composition thus obtained had the following characteristics:
solids content: 17.0%
Apparent viscosity $\eta_a$: 22.4 poise at shear rate D=1 sec$^{-1}$
0.22 poise approx. at shear rate D=10,000 sec$^{-1}$.
pH: 7.64
The polymer microparticles in this product had the following monomer composition:

| Crosslinked polymer | |
|---|---|
| Methyl methacrylate | 47.0% |
| Butyl acrylate | 50.0% |
| Allyl methacrylate | 3.0% |
| Non-crosslinked polymer | |
| Methacrylic acid | 20.0% |
| Hydroxyethyl acrylate | 20.0% |
| Butyl acrylate | 60.0% |

The crosslinked polymer and the non-crosslinked polymer constituted 77.3% and 22.7% respectively of the total microparticle polymer.

E. Application of basecoat and clearcoat to a substrate

The procedure of stage E of Example 6 was repeated, but replacing the basecoat composition there referred to by the basecoat composition described in stage D above.

Similar results to those described in stage G of Example 1 were obtained.

EXAMPLE 8

A. Prepation of aqueous dispersion of polymer microparticles

To a reactor fitted with stirrer, thermometer, reflux condenser and means for controlled introduction of two separate liquid feeds, was charged:

| demineralised water | 58.755 parts |
|---|---|
| followed by | |
| ammonium salt of sulphate of (nonylphenol + 5 mols. ethylene oxide) | 0.264 part |

The contents of the reactor were heated to 80°-85° C. with stirring and the following pre-mixed ingredients were added:

| butyl acrylate | 0.618 part |
|---|---|
| methyl methacrylate | 0.570 part | the reaction mixture was held at 80°-85° C. for 15 minutes, following which there was added a blend of:

| | |
|---|---|
| demineralised water | 0.615 part |
| ammonium persulphate | 0.019 part |

After the contents of the reactor had been held at 80°-85° C. for a further 20 minutes, the following pre-mixed ingredients were fed into the reactor at a constant rate over 3 hours:

| | |
|---|---|
| butyl acrylate | 9.941 parts |
| methyl methacrylate | 9.354 parts |
| allyl methacrylate | 0.634 part |
| ammonium salt of sulphate of (nonylphenol + 5 mols. ethylene oxide) | 0.171 part | and simultaneously there was fed into the reactor at a steady rate, over the same period of 3 hours, a solution of 0.034 part of ammonium persulphate in 4.570 parts of demineralised water.

After completion of the above feeds, the contents of the reactor were held at 80°-85° C. for 1 hour; the following pre-mixed ingredients were then added at a constant rate over a period of 1 hour:

| | |
|---|---|
| methacrylic acid | 1.690 parts |
| butyl acrylate | 5.068 parts |
| hydroxyethyl acrylate | 1.690 parts |
| ammonium salt of sulphate of (nonylphenol + 5 mols. ethylene oxide) | 0.147 part | and simultaneously, at a steady rate over the same period of 1 hour, there was fed into the reactor a solution of 0.024 part of ammonium persulphate and 0.20 part of sodium borate in 5.813 part of demineralised water. At the completion of both feeds, the temperature of the reaction mixture was held at 80°-85° C. for 1 hour, after which it was rapidly cooled to give a stable aqueous dispersion of polymer microparticles. The dispersion had a total non-volatile solids content of 29.3% and a content of non-volatile solids insoluble in organic solvents of 23.4%.

B. Adjustment of pH of aqueous dispersion

To a stirred vessel were added:

| | |
|---|---|
| Dispersion from stage A | 69.87 parts |
| Demineralised water | 12.22 parts |
| Formalin solution | 0.70 part | the contents of the vessel were heated to 90°-95° C. and a mixture of

| | |
|---|---|
| demineralised water | 16.42 parts |
| triethylamine | 0.80 part | was added over 20 minutes. The dispersion was held at 90°-95° C. for two hours, then cooled to give a dispersion having the following properties:
pH: 7.2
solids content: 20.6%

C. Preparation of aluminium pigment concentrate

To a stirred mixing vessel was charged:

| | |
|---|---|
| aluminium paste (metal content, 65%) | 25.0 parts |
| butoxyethanol | 15.0 parts |

These ingredients were stirred together for 15 minutes and a further 73.45 parts of butoxyethanol was then added at a steady rate over 30 minutes, following which the mixture was stirred for a further 1 hour. There was then added 22.5 parts of melamine resin ("Cymel" 325) and stirring was continued for 1 hour; finally, 12.0 parts of polypropylene glycol (average molecular weight 400), 10.0 part of a 5% solution of triethylamine in demineralised water were added and the mixture was stirred for 1 hour more.

D. Preparation of basecoat composition

The following ingredients:

| | |
|---|---|
| aluminium concentrate from stage C | 157.95 parts |
| microparticle dispersion from stage B | 339.81 parts |
| triethylamine, 5% solution in demineralised water | 10.75 parts |
| demineralised water | 177.48 parts | were stirred together for 1 hour. The basecoat composition thus obtained had the following characteristics:
Solids content: 16.3%
Apparent viscosity $_a$:
  21.3 poise at shear rate $D=1$ sec$^{-1}$
  0.20 poise approx. at shear rate $D=10,000$ sec$^{-1}$.
pH: 7.63
The polymer microparticles in this product had the following monomer composition:

| | |
|---|---|
| Crosslinked polymer | |
| Methyl methacrylate | 47.0% |
| Butyl acrylate | 50.0% |
| Allyl methacrylate | 3.0% |
| Non-crosslinked polymer | |
| Methacrylic acid | 20.0% |
| Hydroxyethyl acrylate | 20.0% |
| Butyl acrylate | 60.0% |

The crosslinked polymer and the non-crosslinked polymer constituted 71.4% and 28.6% respectively of the total microparticle polymer.

E. Application of basecoat and clearcoat to a substrate

The procedure of stage E of Example 6 was repeated, but replacing the basecoat composition there referred to by the basecoat composition described in stage D above.

The results were similar to those described in stage G of Example 1.

EXAMPLE 9

A. Preparation of aqueous dispersion of polymer microparticles

To a reactor fitted with stirrer, thermometer, reflux condenser and means for controlled introduction of two separate liquid feeds, was charged:

| | |
|---|---|
| demineralised water followed by | 63.553 parts |

-continued

| ammonium salt of sulphate of (nonylphenol + 5 mols. ethylene oxide) | 0.286 part |

The contents of the reactor were heated to 80°–85° C. with stirring and the following pre-mixed ingredients were added:

| butyl acrylate | 0.669 part |
| methyl methacrylate | 0.617 part |

The reaction mixture was held at 80°–85° C. for 15 minutes, following which there was added a blend of:

| demineralised water | 0.665 part |
| ammonium persulphate | 0.021 part |

After the contents of the reactor had been held at 80°–85° C. for a further 20 minutes, the following pre-mixed ingredients were fed into the reactor at a constant rate over 3 hours:

| butyl acrylate | 10.753 parts |
| methyl methacrylate | 10.115 parts |
| allyl methacrylate | 0.686 part |
| ammonium salt of sulphate of (nonylphenol + 5 mols. ethylene oxide) | 0.185 part | and simultaneously there was fed into the reactor at a steady rate over the same period of 3 hours, a solution of 0.037 part of ammonium persulphate in 4.943 parts of demineralised water.

After the completion of the above feeds the contents of the reactor were held at 80°–85° C. for 1 hour.

The following pre-mixed ingredients were then added at a constant rate over a period of 1 hour:

| methacrylic acid | 1.345 parts |
| butyl acrylate | 5.379 parts |
| ammonium salt of sulphate of (nonylphenol + 5 mols. ethylene oxide) | 0.117 part | and simultaneously, at a steady rate over the same period of 1 hour, there was fed into the reactor a solution of 0.019 part of ammonium persulphate and 0.015 part of sodium borate in 0.591 part of demineralised water.

At the completion of both feeds the temperature of the reaction mixture was held at 80°–85° C. for 1 hour, after which it was rapidly cooled to give a stable aqueous dispersion of polymer microparticles. The dispersion had a total non-volatile solids content of 29.2% and a content of non-volatile solids insoluble in organic solvents of 26.2%.

B. Adjustment of pH of aqueous dispersion

To a stirred vesel were charged:

| dispersion from stage A | 69.863 parts |
| demineralised water | 12.219 parts |
| formalin solution | 0.700 part |

The contents of the vessel were heated to 90°–95° C. and a mixture of

| demineralised water | 16.578 parts |
| triethylamine | 0.640 part | was added over 20 minutes. The dispersion was held at 90°–95° C. for two hours, then cooled to give a dispersion having the following properties:
pH: 7.38
solids content: 20.62%

C. Preparation of aluminium pigment concentrate

To a stirred mixing vessel were charged:

| aluminium paste (metal content, 65%) | 25.0 parts |
| butoxyethanol | 15.0 parts |

These ingredients were stirred together for 15 minutes and a further 45.73 parts of butoxy ethanol was then added at a steady rate over 30 minutes, following which the mixture was stirred for a further 1 hour. There was then added 22.5 parts of melamine resin ("Cymel" 325) and stirring was continued for 1 hour; finally. 12 parts of polypropylene glycol (average molecular weight 440) and 10 parts of a 5% solution of triethylamine in demineralised water were added and the mixture stirred for 1 hour.

D. Preparation of basecoat composition

The following ingredients:

| aluminium concentrate from stage C | 130.23 parts |
| microparticle dispersion from stage B | 339.48 parts |
| triethylamine (5% solution in demineralised water) | 35.34 parts |
| demineralised water | 32.70 parts | were stirred together for 1 hour. The basecoat composition thus obtained had the following characteristics:
Solids content: 22%
Apparent viscosity $_a$:
  38.1 poise at shear rate $D = 1$ sec$^{-1}$
  0.22 poise at shear rate $D = 10,000$ sec$^{-1}$
pH: 8.51
The polymer microparticles in this product had the following monomer composition:

| Crosslinked polymer | |
| --- | --- |
| Methyl methacrylate | 47.0% |
| Butyl acrylate | 50.0% |
| Allyl methacrylate | 3.0% |
| Non-crosslinked polymer | |
| Methacrylic acid | 20.0% |
| Butyl acrylate | 80.0% |

The crosslinked polymer and the non-crosslinked polymer constituted 77.3% and 22.7% respectively of the total microparticle polymer.

E. Application of basecoat and clearcoat to a substrate

The procedure of stage E of Example 6 was repeated, but replacing the basecoat composition there referred to by the basecoat composition described in stage G of Example 1 were obtained.

We claim:

1. A basecoat composition suitable for use in a process for the production of a multi-layer protective and/or decorative coating upon a substrate surface, which process comprises the steps of:
   (1) applying to the surface a basecoat composition;
   (2) forming a polymer film upon the surface from the composition applied in step (1);
   (3) applying to the basecoat film so obtained a transparent topcoat composition comprising (d) a film-forming polymer, and (e) a volatile carrier liquid for the said polymer;
   (4) forming a second polymer film upon the basecoat film from the composition applied in step (3); and
   (5) curing the polymer film from steps (2) and (4), said basecoat composition comprising:
      (a) a film-forming material,
      (b) a volatile liquid medium for said material, and
      (c) pigment particles dispersed in said medium; characterised in that constituents (a) and (b) of the basecoat composition are provided by a pseudoplastic or thixotropic dispersion in an aqueous medium of crosslinked polymer microparticles which have a diameter in the range of about 0.01 to about 10 microns, are insoluble in the same aqueous medium and are stable towards gross flocculation, the dispersion having been produced by the steps of:
(I) polymerising in an aqueous medium in thepresence of a stabiliser a first mixture of ethylenically unsaturated monomers consisting of:
   (i) 98.5–90% by weight of monomers which contain in the molecule a single polymerisable unsaturated grouping, and
   (ii) 1.5–10% by weight of monomers which contain in the molecule at least two polymerisable unsaturated groupings, so as to produce a dispersion of particles of crosslinked polymer;
(II) polymerising in the same medium and in the presence of the said crosslinked particles a second mixture of ethylenically unsaturated monomers consisting of:
   (iii) 2–30% by weight of an unsaturated carboxylic acid,
   (iv) 0–30% by weight of a hydroxyl group-containing monomer, and
   (v) 40–98 parts by weight of one or more other monomers different from those of (iii) or (iv), so as to produce a non-crosslinked polymer which is capable of forming a water-soluble salt derivative, the crosslinked polymer constituting 40–95% by weight of the total polymer of steps (I) and (II), and
(III) subsequently forming the said salt derivative by neutralising the carboxyl groups present in the non-crosslinked polymer with an inorganic or organic base in the presence of the same aqueous medium.

2. A basecoat composition as claimed in claim 1, wherein the polymer microparticles are composed of acrylic addition polymers derived mainly from one or more alkyl esters of acrylic acid or methacrylic acid.

3. A basecoat composition as claimed in claim 2, wherein the microparticle dispersion has been produced by a process in which steps (I) and (II) each consist of aqueous emulsion polymerisation of the constituent monomers.

4. A basecoat composition as claimed in claim 3, wherein the microparticle dispersion has been produced by (I) emulsion polymerisation of a first mixture of monomers consisting of:
   (i) from 96.8 to 97.0% by weight of an acrylic monomer containing a single unsaturated grouping, and
   (ii) from 3.2% to 3.0% by weight of an acrylic monomer containing at least two unsaturated groupings;
followed by (II) emulsion polymerisation of a second mixture of monomers consisting of:
   (iii) from 14% to 20% by weight of an acrylic monomer containing a carboxyl group
   (iv) from 0% to 25.7% by weight of an acrylic monomer containing a hydroxyl group, and
   (v) from 56.4% to 80% by weight of an acrylic monomer different from that of (iii) or (iv),
the relative proportions of the monomer mixtures polymerised in (I) and (II) respectively being such that the crosslinked polymer from (I) and the non-crosslinked polymer from (II) constitute from 71.4% to 80% and from 28.6% to 20% respectively by weight of the total microparticle polymer, and subsequently (III) forming a salt derivative of the polymer from (II) by neutralisation of the product with an organic base.

5. A basecoat composition as claimed in claim 3, wherein the microparticles dispersion has been produced by (I) emulsion polymerisation of a first mixture of monomers consisting of:
   (i) 47.2% by weight of methyl methacrylate and 49.6% by weight of butryl acrylate;
   (ii) 3.2% by weight of allyl methacrylate
followed by (II) emulsion polymerisation of a second mixture of monomers consisting of:
   (iii) 17.9% by weight of methacrylic acid
   (iv) 25.7% by weight of hydroxyethyl acrylate
   (v) 17.9% by weight of methyl methacrylate and 38.5% by weight of butyl acrylate
the relative proportions of the monomer mixtures polymerised in (I) and (II) respectively being such that the crosslinked polymer from (I) and the non-crosslinked polymer from (II) constitute 80.4% and 19.6% respectively by weight of the total microparticle polymer, and subsequently (III) forming a salt derivative of the polymer from (II) by neutralisation of the product with dimethylaminoethanol.

6. A basecoat composition as claimed in claim 3, wherein the microparticle dispersion has been produced by (I) emulsion polymerisation of a first mixture of monomers consisting of:
   (i) 47.0% by weight of methyl methacrylate, 50.0% by weight of butyl acrylate;
   (ii) 3.0% by weight of allyl methacrylate
followed by (II) emulsion polymerisation of a second mixture of monomers comprising:
   (iii) 14.0% by weight of methacrylic acid
   (iv) 20% by weight of hydroxyethyl acrylate
   (v) 60% by weight of butyl acrylate
the relative proportions of the monomer mixtures polymerised in (I) and (II) respectively being such that the crosslinked polymer from (I) and the non-crosslinked polymer from (II) constitute from 71.4% to 77.3% and from 28.6% to 22.7% respectively by weight of the total microparticle polymer, and subsequently (III) forming a salt derivative of the polymer from (II) by neutralisation of the product with triethylamine.

7. A basecoat composition as claimed in claim 3, wherein the dispersion has been produced by (I) emulsion polymerisation of a first mixture of monomers consisting of:

(i) 47.0% by weight of methyl methacrylate and 50.0% by weight of butyl acrylate;
(ii) 3.0% by weight of allyl methacrylate
followed by (II) emulsion polymerisation of a second mixture of monomers consisting of:
(iii) 20.0% by weight of methacrylic acid
(v) 80.0% by weight of butyl acrylate
the relative proportions of the monomer mixtures polymerised in (I) and (II) respectively being such that the crosslinked polymer from (I) and the non-crosslinked polymer from (II) constitute 77.3% and 22.7% respectively by weight of the total microparticle polymer, and subsequently (III) forming a salt derivative of the polymer from (II) by neutralisation of the product with triethylamine.

8. A basecoat composition as claimed in claim 2, wherein the polymer microparticles are produced by a process in which steps (I) and (II) each consist of dispersion polymerisation of the constituent monomers in a medium which consists of water admixed with a volatile organic cosolvent and which is as a whole capable of dissolving the monomers, the polymerisation being conducted at a temperature which is at least 10° C. higher than the glass transition temperature of the polymer to be formed and in such a manner that at no time is there present a separate monomer phase, in the presence of a polymeric stabiliser having one component which is a polymer chain solvated by the aqueous medium and another component which is a polymer chain not solvated by that medium.

9. A basecoat composition as claimed in claim 1, which contains from 5% to 80% by weight of the polymer microparticles, based on the total non-volatile content of the composition.

* * * * *